(12) United States Patent
Crystal et al.

(10) Patent No.: US 12,307,431 B2
(45) Date of Patent: May 20, 2025

(54) SYSTEMS, APPARATUS, AND METHODS FOR PROVIDING DATA ENTRY FEEDBACK AT ELECTRONIC USER DEVICES

(71) Applicant: Shopify Inc., Ottawa (CA)

(72) Inventors: Daniel Crystal, Maple (CA); Christopher Freeman Saldanha, Ottawa (CA)

(73) Assignee: Shopify Inc., Ottawa (CA)

( * ) Notice: Subject to any disclaimer, the term of this patent is extended or adjusted under 35 U.S.C. 154(b) by 327 days.

(21) Appl. No.: 17/559,868

(22) Filed: Dec. 22, 2021

(65) Prior Publication Data

US 2023/0196323 A1 Jun. 22, 2023

(51) Int. Cl.
G06Q 20/00 (2012.01)
G06Q 20/18 (2012.01)
G06Q 20/20 (2012.01)

(52) U.S. Cl.
CPC ........... *G06Q 20/201* (2013.01); *G06Q 20/18* (2013.01); *G06Q 20/202* (2013.01)

(58) Field of Classification Search
CPC .... G06Q 20/201; G06Q 20/18; G06Q 20/202; G06F 3/04883; G06F 3/167
See application file for complete search history.

(56) References Cited

U.S. PATENT DOCUMENTS

| | | | |
|---|---|---|---|
| 7,350,700 B1 | 4/2008 | Block et al. | |
| 10,446,158 B1 | 10/2019 | Edwards et al. | |
| 11,010,044 B2 | 5/2021 | Sartori et al. | |
| 2014/0123057 A1 | 5/2014 | Eigner et al. | |
| 2015/0100498 A1 | 4/2015 | Edwards | |
| 2016/0253488 A1* | 9/2016 | Zheng | G06F 21/31 726/19 |
| 2017/0192950 A1* | 7/2017 | Gaither | G10L 15/22 |
| 2021/0383386 A1 | 12/2021 | Abrams et al. | |
| 2023/0185522 A1 | 6/2023 | Crystal | |

OTHER PUBLICATIONS

Canadian Patent Office, "Office Action," issued in connection with Canadian Patent Application No. 3,169,559, dated Dec. 1, 2023, 5 pages.

(Continued)

*Primary Examiner* — Rokib Masud
(74) *Attorney, Agent, or Firm* — Hanley, Flight & Zimmerman, LLC

(57) ABSTRACT

Systems, apparatus, and methods for providing data entry feedback at electronic user devices are disclosed. An example apparatus includes instructions stored in a memory and processor circuitry to execute the instructions to identify a first value based on a first input in a data entry field via an interface of an electronic device, the first value representing contents of the data entry field at a first time; cause the electronic device to output a first audio output of the first value; identify a second value based on the first input and a second input, the second input received in the data entry field after the first input, the second value representing the contents of the data entry field at a second time, the second time after the first time; and cause the electronic device to output a second audio output of the second value.

19 Claims, 10 Drawing Sheets

(56) References Cited

OTHER PUBLICATIONS

United States Patent and Trademark Office, "Final Office Action," issued in connection with U.S. Appl. No. 17/548,260, dated May 14, 2024, 21 pages.
United States Patent and Trademark Office, "Non-Final Office Action," issued in connection with U.S. Appl. No. 17/548,260, dated Jan. 17, 2024, 20 pages.
United States Patent and Trademark Office, "Non-Final Office Action," issued in connection with U.S. Appl. No. 17/548,260, dated Dec. 20, 2022, 20 pages.
United States Patent and Trademark Office, "Final Office Action," issued in connection with U.S. Appl. No. 17/548,260, dated May 23, 2023, 20 pages.
United States Patent and Trademark Office, "Advisory Action," issued in connection with U.S. Appl. No. 17/548,260, dated Aug. 18, 2023, 5 pages.
Canadian Patent Office, "Office Action," issued in connection with Canadian Patent Application No. 3,169,556, dated Jun. 3, 2024, 4 pages.
Canadian Patent Office, "Office Action," issued in connection with Canadian Patent Application No. 3,169,559, dated Feb. 3, 2025, 4 pages.

* cited by examiner

SYSTEMS, APPARATUS, AND METHODS FOR PROVIDING DATA ENTRY FEEDBACK AT ELECTRONIC USER DEVICES

FIELD OF THE DISCLOSURE

This disclosure relates generally to electronic user devices and, more particularly, to systems, apparatus, and methods for providing data entry feedback at electronic user devices.

BACKGROUND

A user may enter data at an electronic device, such as a service tip amount using a point-of-sale (POS) terminal or a dollar amount to withdraw from a bank account using an automated teller machine (ATM). When entering the values, the user may make a mistake that can cause the user to enter the wrong amount. For instance, the user may mis-enter digits or misplace a location of a decimal point in a dollar value. Alternatively, an error can result from a malfunction of the device (e.g., the device does not register certain button presses or touch inputs). As a result, the user may enter unintended values (e.g., over-tip or under-tip when providing a service tip). Such concerns are heightened for users who are visually impaired and/or have other disabilities.

BRIEF DESCRIPTION OF THE DRAWINGS

The figures are not to scale. In general, the same reference numbers will be used throughout the drawing(s) and accompanying written description to refer to the same or like parts.

Figure 1:
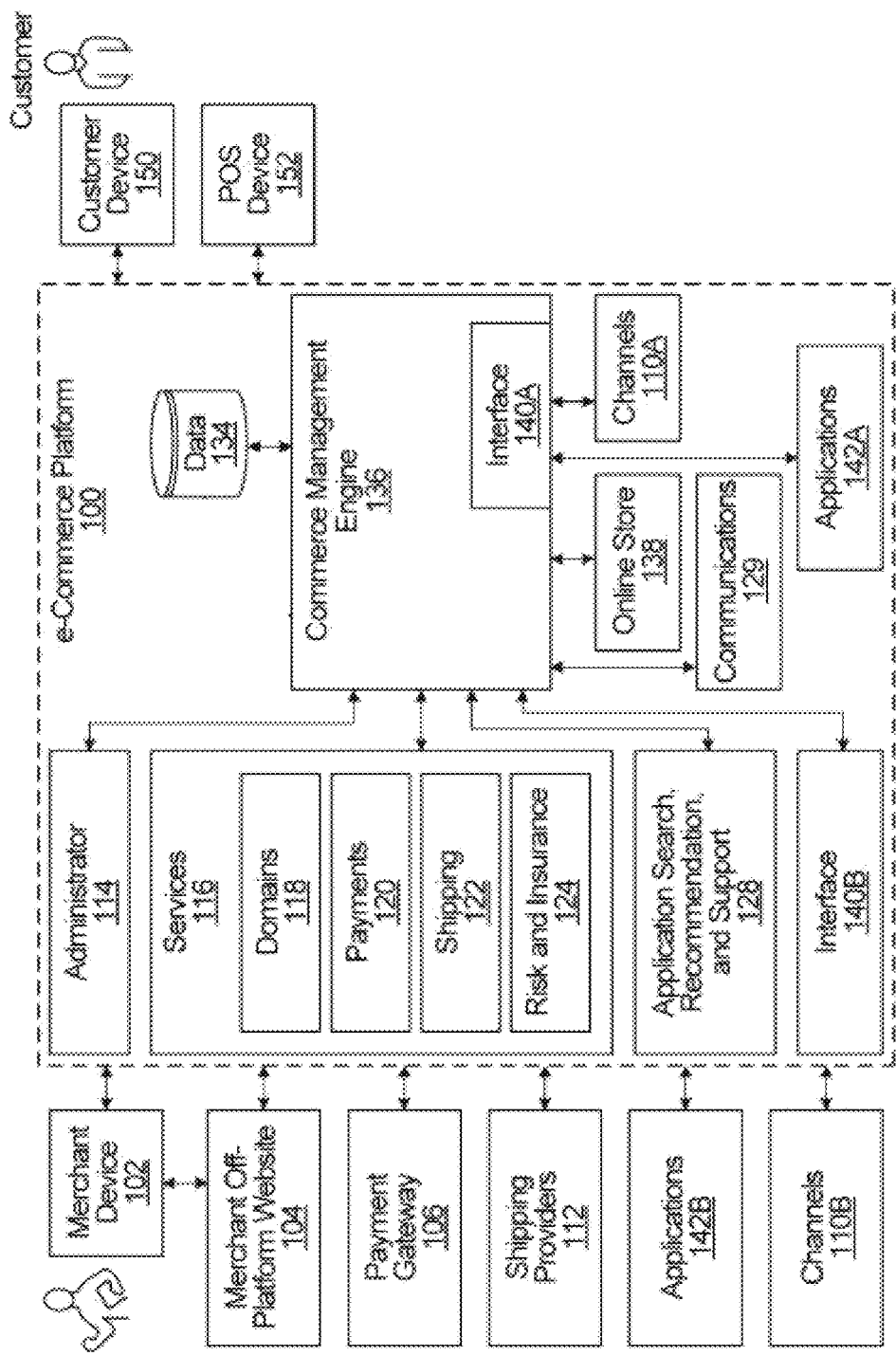
FIG. 1 is a block diagram of an example e-commerce platform.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

A visual impairment or other disability may present difficulties for a user when interacting with electronic devices such as an automated teller machine (ATM) or point-of-sale device (e.g., credit card terminal) and, in particular, when the user is providing customized data inputs at the device, such as customized service tip amounts. For instance, when entering numerical values such as a service tip or an amount of money to withdraw from a bank account, the user may make a mistake that can cause the user to enter the wrong amount. The user may mis-enter digits or misplace a location of a decimal point in a dollar value. Alternatively, an error can result from a malfunction of the device if, for instance, the device does not register or incorrectly registers certain button presses or touch inputs at the device. As a result, the user may enter values that the user did not intend, which can result in, for example, over-tipping, under-tipping, withdrawing too much from an account, etc.

Some known devices provide audio feedback of each individual input (e.g., digit) that has been entered by the user at a user device. However, it may be difficult for a user to understand the total value that has been entered when the digits are read back individually (e.g., the digits "one," "six," and "zero" could correspond to "sixteen dollars and zero cents" or "one hundred sixty dollars").

Disclosed herein are example apparatus, systems, and methods that provide for audio outputs representative of content that has been entered into a data entry field via an interface of an electronic device (e.g., a POS terminal, an automated teller machine (ATM), a smartphone) based on a context associated with the data entry field. Examples disclosed herein translate the input(s) (e.g., digit(s)) entered in the data entry field into content that represents, for instance, a cumulative or current value in the data entry field at a given time. The content can be associated with a numerical context such as currency amounts, data formats (e.g., to distinguish between date in a day-month-year format or a month-day-year format, etc.). For instance, for a data entry field at a POS terminal that enables a user to enter a customized service tip, examples disclosed herein determine a value (e.g., a total value) of the inputs in dollars based on the context associated with the data entry field (i.e., dollar amounts). Examples disclosed herein provide audio feedback to the user that indicates the total amount in dollars that has been entered into the data entry field. Thus, rather than outputting audio of the individual digit(s) entered into the field, examples disclosed herein provide contextual-based audio feedback of the content in the data entry field.

Some examples disclosed herein provide audio output(s) of the content in the data field (e.g., a cumulative or current value) after each input has been entered (e.g., via a touchscreen input, a button, etc. at the device). As an example, when a user enters a service tip amount in a field that permits data entry in dollars, instead of reading back the digit "one" after the user enters the digit "one", examples disclosed herein cause an audio output of "one dollar" to be presented. When the user subsequently enters the digit "six", examples disclosed herein cause an audio output of "sixteen dollars" to be presented. When the user subsequently enters the digit "five", examples disclosed herein cause an audio output of "one hundred sixty-five dollars" to be presented. Thus, examples disclosed herein inform the user of the cumulative value of the amount of the tip entered and can confirm the amount or address any errors (e.g., in the event the user did not intend to tip one hundred sixty-five dollars). In other examples, the audio outputs are provided in response to, for instance, user commands, after a threshold time has passed since an input in the data entry field, and/or based on other settings.

Examples disclosed herein translate individual data inputs such as numerical inputs into content that represents, for instance, a total value of the numerical inputs entered into a data entry field at a particular time. Examples disclosed herein execute one or more rules or models to recognize the inputs in the context of the data entry field, such as a total value of the digit(s) entered in dollars. Examples disclosed herein can perform the content recognition analysis in response to changes in the inputs at the data entry field (e.g., entry of new inputs, deletion of an input) and, thus, provide dynamic feedback of content (e.g., a cumulative or current value) that has been entered in the data entry field at a particular time. As a result, examples disclosed herein provide for improved audio assistance to a user interacting with a device such as a POS terminal when providing customized data entry as compared to providing outputs of, for instance, individual digits.

Although integration with a commerce platform is not required, in some embodiments, the examples disclosed herein may be performed on or in association with a commerce platform such as an e-commerce platform. Therefore, an example of a commerce platform will be described.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an online business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
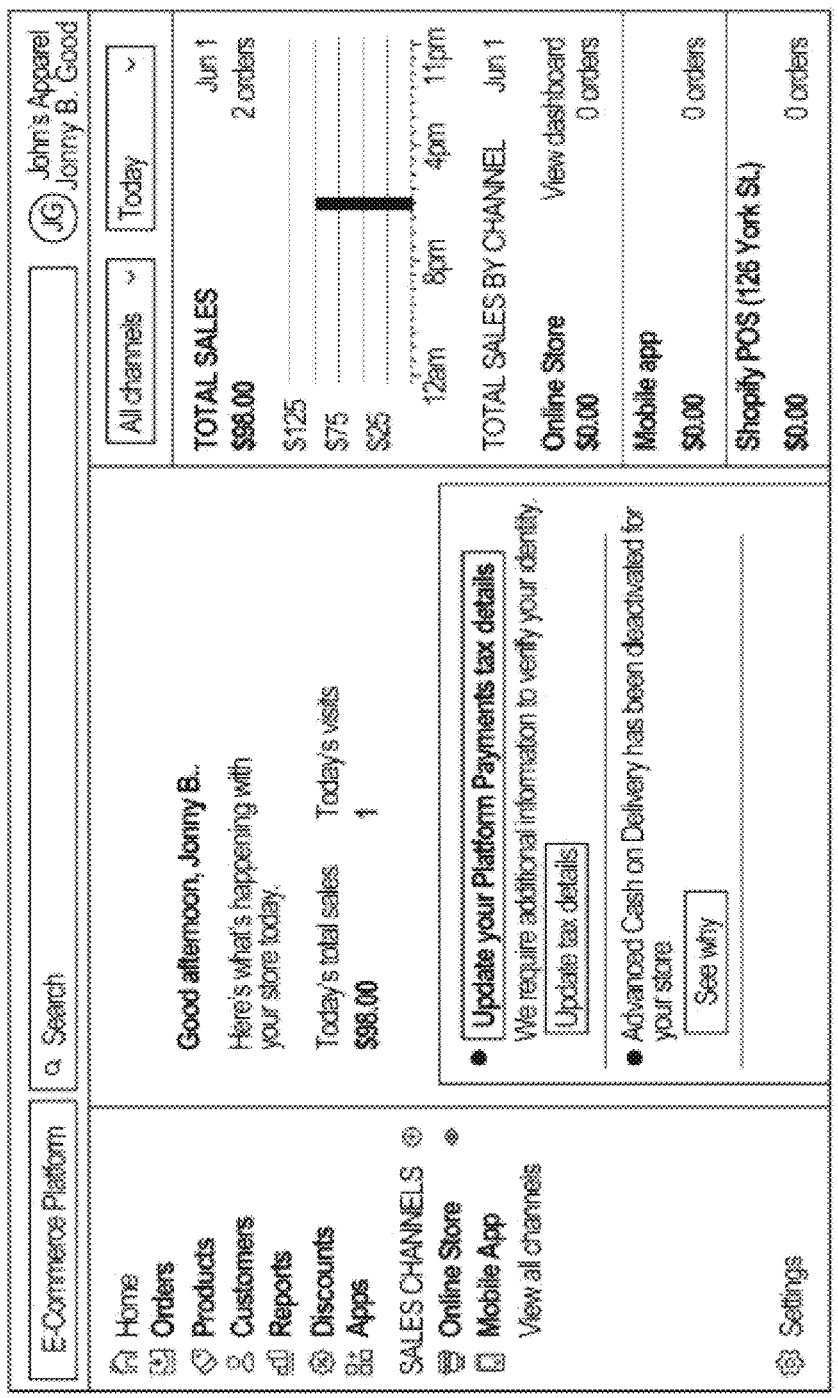
FIG. 2 is an illustration of an example home page of an administrator of the e-commerce platform of FIG. 1.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Figure 3:
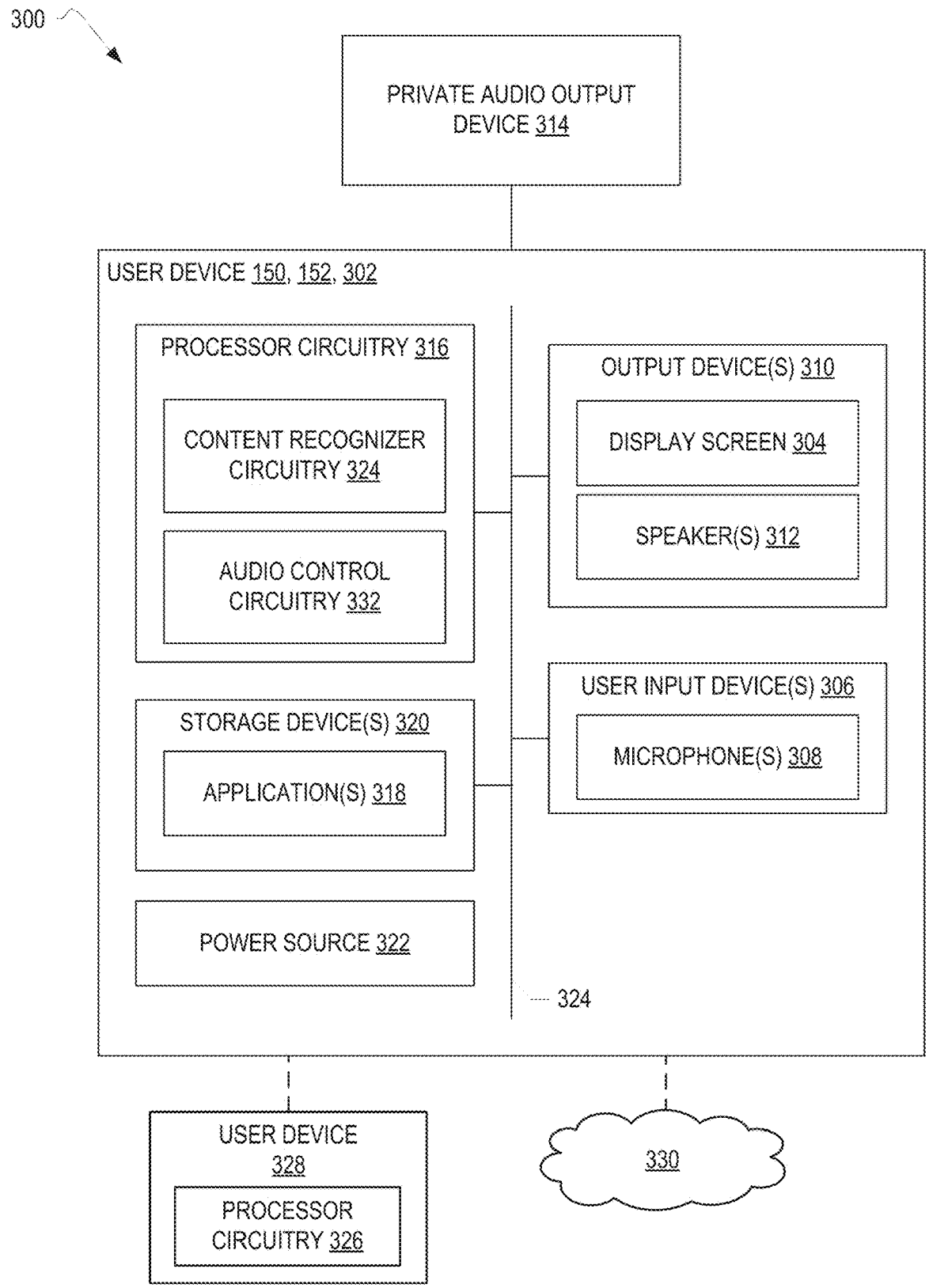
FIG. 3 illustrates an example system constructed in accordance with teachings of this disclosure and including an electronic user device and content recognizer circuitry for providing data entry feedback at the user device.

FIG. 3 illustrates an example system 300 constructed in accordance with teachings of this disclosure for providing feedback with respect to data entry by a user at an electronic user device. The example system 300 of FIG. 3 includes an electronic user device 302 to enable a user to interface with a commerce platform such as the e-commerce platform 100 of FIG. 1. The user device 302 can include the customer device 150 of FIG. 1. For instance, the user device 302 can include a mobile computing device, a smartphone, an electronic tablet, a desktop computer, a laptop computer, etc. Additionally or alternatively, the user device 302 can include the POS device 152. In such examples, the user device 302 can include a retail device, a kiosk, automated (self-service) checkout system, etc. In some examples, the user device 302 includes a cash register device including a remote component for buyer data entry, such as a grocery store cash station with a buyer-facing display; a dedicated payment terminal including a display screen; a desktop or a laptop computer used in a point-of-sale system, etc. The user device 302 can include other types of user input devices such as an automated teller machine (ATM). In some examples, the user device 302 includes the merchant device 102 of FIG. 1.

The example user device 302 of FIG. 3 includes a display screen 304 to present graphical content to a user of the user device 302. In some examples, the display screen 304 is a touch screen that enables a user to interact with data presented on the display screen 304 by touching the display screen 304 with a stylus and/or one or more fingers or a hand of the user. Thus, the display screen 304 can serve as an input device. Additionally or alternatively, the user can interact with data presented on the display screen 304 via other user input device(s) 306 such as microphone(s) 308, a keyboard, a mouse, touch pad, etc. The example user device 302 includes one or more output device(s) 310 such as speaker(s) 312 to provide audible outputs to the user of the user device 302. In some examples, the output device(s) can include alternative interfaces such as Braille displays, haptic (e.g., vibration) feedback for a hand-held user device, etc. In other examples, a private audio output device 314 such as headphones can be communicatively coupled to the user device 302 to output audio (e.g., via a wired or wireless communicative coupling).

The example user device 302 of FIG. 3 includes processor circuitry 316. The processor circuitry 316 of the example user device 302 is a semiconductor-based hardware logic device. The hardware processor circuitry 316 may implement, for instance, a central processing unit (CPU) of the user device 302. The processor circuitry 316 executes machine readable instructions (e.g., software) including, for example, application(s) 318 such as commerce application(s), financial application(s), etc. installed on the user device 302. For instance, the application(s) 318 can be used to facilitate tipping for a service, financial transactions such as the withdrawal of money from a personal banking account, etc. The user application(s) 318 are stored in one or more storage devices 320 such as non-volatile memory (e.g., flash memory). The example user device 302 of FIG. 1 includes a power source 322 such as a battery and/or transformer and AC/DC converter to provide power to the processor circuitry 316 and/or other components of the user device 302 communicatively coupled via a bus 323.

In the example of FIG. 3, the application(s) 318 executed by the processor circuitry 316 can include one or more data entry fields to receive input(s) from the user. The data entry field(s) can be associated with entry of customized data. For instance, the data entry field(s) can permit entry of customized numeric data such as currency amounts, dates, etc. The data entry field(s) can be presented via a graphical user interface displayed on the display screen 304 when the user is interacting with the application 318. Input(s) to the data entry field(s) can be provided via, for instance, touch input(s) on the display screen 304, via the user input device(s) 306 (e.g., keyboard inputs, the microphone(s) 308).

In the example of FIG. 3, content recognizer circuitry 324 recognizes, identifies, predicts, or otherwise determines content in a data entry field of the application 318 based on a context associated with the data entry field. The content recognizer circuitry 324 causes the content to be presented as an audio output at the user device 302 (e.g., via the speaker(s) 312, via the private audio output device 314). For instance, for a data entry field associated with entry of a dollar amount (or other currency, such as the euro), the content recognizer circuitry 324 recognizes the inputs in the data entry field (i.e., numeric digits) as content that is a dollar amount and cause an audio output corresponding to the dollar amount in the data entry field at a given time to be presented. Thus, rather than treating the numeric digits in the data entry field as individual digits and providing audio outputs of the individual digits (e.g., "one," "five"), the content recognizer circuitry 324 identifies or recognizes the numeric digits in the context of the data entry field (e.g., dollars) and provides a context-driven audio output (e.g., the amount in dollars entered into the data entry field, such as "fifteen dollars").

The content recognizer circuitry 324 dynamically interprets or translates inputs in the data entry field into context-based content and provides corresponding audio output(s). For instance, the content recognizer circuitry 324 can recognize a value of "one dollar" in a dollar-based data entry field in response to entry of a first digit "one" in the data entry field. The content recognizer circuitry 324 causes an audio output corresponding to the value of "one dollar" to be presented in response to the entry of the digit "one." In response to a subsequent entry of the digit "six" in the data entry field, the content recognizer circuitry 324 recognizes a value of "sixteen dollars" in the data entry field and causes an audio output corresponding to the value of "sixteen dollars" to be presented in response to the entry of the digit "six" in the data entry field after the entry of the digit "one" in the data entry field. Thus, the content recognizer circuitry 324 can provide for substantially real-time output (e.g., +/−1 second) of audio feedback representing cumulative or current content in the data entry field based on a context associated with the data entry field and the input(s) in the field.

In some examples, the content recognizer circuitry 324 is activated in response to a selection of an accessibility mode for the application 318. In other examples, the content recognizer circuitry 324 provides for detection of content in the data entry field and audio output(s) corresponding to the content regardless of an operating mode of the application 318 (e.g., based on user preferences or predefined application settings).

Although examples disclosed herein are discussed in connection with numerical values, in other examples, examples disclosed herein could be used in connection with other types of data, such as letters (e.g., to predict a word entered into a data entry field), symbols, etc.

In the example of FIG. 3, the content recognizer circuitry 324 is implemented by executable instructions executed on the processor circuitry 316 of the user device 302. However, in other examples, content recognizer circuitry 324 is implemented by processor circuitry 326 of another user device 328 (e.g., a smartphone, an edge device, a wearable device, etc.) in communication with the user device 302 (e.g., via wired or wireless communication protocols), and/or by a cloud-based device 330 (e.g., one or more server(s), processor(s), and/or virtual machine(s)). In other examples, the content recognizer circuitry 324 is implemented by dedicated circuitry located on the user device 302 and/or the user device 328. These components may be implemented in software, hardware, or in any combination of two or more of software, firmware, and/or hardware.

In some examples, one or more components of the content recognizer circuitry 324 is implemented by operation system software of the user device 302 and/or the other user device 328. In some examples, one or more components of the content recognize circuitry 324 is implemented by an application (e.g., an application 318 such as a point-of-sale application, a merchant application, etc.) that receives user inputs for interpretation by the content recognize circuitry 324. In some examples, the user device 302 is a point-of-sale device and one or more components of the content recognizer circuitry 324 is implemented by the other (e.g., personal) user device 328 (e.g., an application associated with the content recognizer circuitry 324 that is downloaded to a personal user device 328 to enable a user to enter inputs via the personal user device 328, where the inputs are communicated to other components of the content recognizer circuitry 324 implemented by the merchant device 302).

In the example of FIG. 3, audio control circuitry 332 causes the audio feedback of the content in the data entry field to be output via, for instance, the speaker(s) 312 of the user device 302 or the private audio output device 314 communicatively coupled to the user device 302. In the example of FIG. 3, the audio control circuitry 332 is implemented by executable instructions executed on the processor circuitry 316 of the user device 302. In some examples, the audio feedback is transmitted to a personal device of a user (e.g., the other user device 328 such as a smartphone) or another device different than the user device 302. For instance, the user device 302 may be a merchant device and a private audio channel is unable to be established with the user's private audio output device 314 and the merchant device 302 (e.g., if the user's headphones are unable to be communicatively coupled to the merchant device 302, etc.). In such examples, a private audio channel may be established between the user's personal device (e.g., the user device 328) and the private audio device 314 and the audio outputs are transmitted to the user's personal device for output via the private audio device 314.

In response to the audio output(s) representing the content in the data entry field, the user of the application 318 can, for example, confirm entry of the inputs in the data entry field, undo or delete an input from the field, enter additional inputs into the field, etc. The content recognizer circuitry 324 detects changes with respect to the inputs in the data entry field over time and causes updated audio outputs corresponding to the current content in the data entry field at a given time to be presented.

Figure 4:
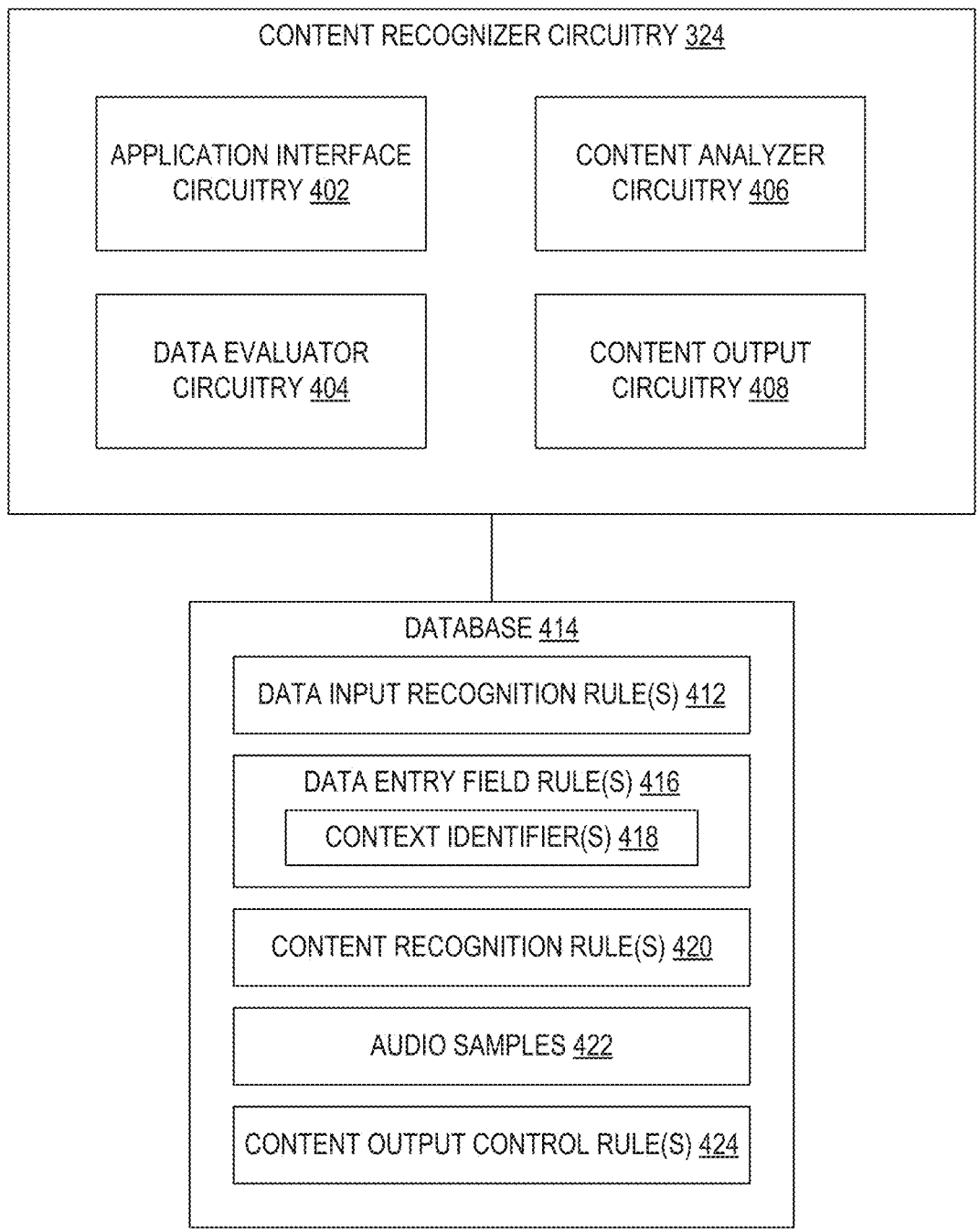
FIG. 4 is an example implementation of the content recognizer circuitry of FIG. 3.

FIG. 4 is a block diagram of an example implementation of the content recognizer circuitry 324 of FIG. 3. As mentioned above, the content recognizer circuitry 324 is structured to recognize or predict content entered in a data entry field of an application based on the context of the data entry field and to provide audio output(s) of the content in the corresponding context. The data entry field can include, for example, a field to enter a service tip at point-of-sale device, a field to enter an amount to withdrawal or deposit at an ATM, a field to enter a date in numeric format (e.g., MM-DD-YYYY or DD-MM-YYYY), etc. In the example of FIG. 4, the content recognizer circuitry 324 is implemented by one or more of the processor circuitry 316 of the user device 302, the processor circuitry 326 of the second user device 328, and/or the cloud-based device(s) 330 (e.g., server(s), processors(s), and/or virtual machine(s) in the cloud 330 of FIG. 3 executing instructions). In some examples, some of the content recognition analysis is implemented by the content recognizer circuitry 324 via a cloud-computing environment and one or more other parts of the analysis is implemented by the processor circuitry 316 of the user device 302 and/or the processor circuitry 326 of the user device 328 such as a wearable device. In some examples, the content recognizer circuitry 324 is implemented by special purpose circuitry.

The example content recognizer circuitry 324 of FIG. 4 includes application interface circuitry 402, data evaluator circuitry 404, content analyzer circuitry 406, and content output circuitry 408.

In some examples, the application interface circuitry 402 receives instructions from an application 318 (FIG. 3) installed on the user device 302 that an accessibility mode for the application 318 has been enabled (e.g., based on a user input). In response to such instructions, the application interface circuitry 402 can cause the data evaluator circuitry 404, the content analyzer circuitry 406, and the content output circuitry 408 to be activated to recognize content in a data entry field and to provide audio output(s) corresponding to the content based on a context associated with the data entry field. In other examples, the application interface circuitry 402 receives instructions from the application 318 that the user has selected to receive the content as audio outputs based on, for instance, previous user preferences as defined in user profile information and with or without the accessibility mode being enabled. In other examples, the data evaluator circuitry 404, the content analyzer circuitry 406, and the content output circuitry 408 are activated without input(s) from the user at the application 318.

In the example of FIG. 4, the application interface circuitry 402 receives instruction(s) or indication(s) from the application 318 that one or more inputs have been received in a data entry field generated by the application 318. The instructions from the application 318 can include data entry field identification information indicative of the particular data entry field for which the input(s) have been provided. The instructions from the application 318 can include the input(s) received in the data entry field (e.g., in text form, as a snapshot or image of the data entry field from the interface at a given time, etc.).

The data evaluator circuitry 404 identifies or recognizes the input(s) received in the data entry field. For example, the data evaluator circuitry 404 executes one or more data input recognition rule(s) 412 to identify the inputs based on, for example, text recognition. The data input recognition rule(s) 412 are stored in a database 414. In some examples, the content recognizer circuitry 324 includes the database 414. In other examples, the database 414 is located external to the content recognizer circuitry 324 in a location accessible to the content recognizer circuitry 324 as shown in FIG. 4.

The data evaluator circuitry 404 evaluates the input(s) received at the data entry field based on data entry field rule(s) 416. The data entry field rule(s) 416 can define parameters and/or properties of the data entry field. For example, the data entry field rule(s) 416 can define type(s) of inputs permitted in the data entry field (e.g., numbers but not symbols, or numbers and certain symbols such as a decimal point but not more than one decimal point, etc.), a minimum or maximum number of inputs to be received in the data entry field, etc. The data entry field rule(s) 416 can be defined based on user inputs and stored in the database 414.

The data evaluator circuitry 404 analyzes the input(s) in the data entry field based on the data entry field rule(s) 416 to identify any error(s) in the input(s). In particular, the data evaluator circuitry 404 identifies error(s) in the data inputs in the data entry field to prevent, for instance, the content output circuitry 408 from generating nonsensical outputs (e.g., a dollar amount including two decimal points) and to facilitate correction of the errors by the user. For instance, the data evaluator circuitry 404 can detect that a user has entered a decimal point in a data entry field at a first time. The data evaluator circuitry 404 can detect that the user entered a second decimal point in the data entry field at a second time after the first time such that two decimal points are in the data entry field. The data evaluator circuitry 404 can generate an error message based on the data entry field rule(s) 416 indicating that only one decimal point should be entered (e.g., as with a field that accepts dollars and cents). The error message can include an audio alert, an alert presented via a user interface, etc. The data evaluator circuitry 404 can communicate with the application interface circuitry 402 and/or the audio control circuitry 332 to cause output of the error message(s) via the user device 302.

In examples in which the data evaluator circuitry 404 detects error(s) in the input(s) in the data entry field, the content recognizer circuitry 324 may refrain from further analyzing the input(s) in the data entry field until the application interface circuitry 402 receives another indication from the application 318 that input(s) have been received in the data entry field and the data evaluator circuitry 404 determines that there are no errors in the input(s) (e.g., based on the data entry field rule(s) 416). For instance, the data evaluator circuitry 404 can detect that the second decimal point has been removed or replaced with a numerical value. The error evaluation process performed by the data evaluator circuitry 404 conserves processing resources when error(s) are detected in the data entry field and prevents nonsensical audio outputs.

If the data evaluator circuitry 404 does not identify any errors in the input(s) in the data entry field, the content analyzer circuitry 406 identifies, recognizes, predicts, or otherwise determines content associated with the input(s) in the data entry field and a context of the data entry field. The data entry field rule(s) 416 can define context identifier(s) 418 for the data entry field(s) of the application 318. The context identifier(s) 418 define a context associated with the data entry field and, thus, the input(s) entered into the field. For example, the context identifier(s) 418 can identify that a data entry field is associated with a monetary identifier (e.g., dollars; dollars and cents) or a date identifier (e.g., month-day-year, day-month-year).

The content analyzer circuitry 406 executes one or more content recognition rule(s) 420 to translate the input(s) in the data entry field into content representing the input(s) within a context of the data entry field. The content recognition rule(s) 420 can include model(s) to facilitate prediction and/or recognition of the content based on the input(s) in the data entry field and the associated context identifier(s) 418. As a result of execution of the content recognition rule(s) 420, the content analyzer circuitry 406 outputs value(s) representing the content in the data entry field in the context of the data entry field. The value(s) can represent cumulative or current content of the data entry field at a given time.

For example, the content analyzer circuitry 406 can determine that a data entry field for entering a customized monetary amount is associated with dollars and cents based on the content identifier(s) 418 for the data entry field. The content analyzer circuitry 406 executes the content recognition rule(s) 420 for the numeric inputs in the data entry field at a given time (e.g., based on instructions received from the application 318 via the application interface circuitry 402). As a result of execution of the content recognition rule(s) 420, the content analyzer circuitry 406 generates an output including a value of the numeric input(s) in the data entry field in dollars and cents. In some examples, as a result of execution of the content recognition rule(s) 420, the content analyzer circuitry 406 determines the value based on, for example, position(s) of the input(s) within the data entry field (e.g., inputs following a decimal point represent cents in a monetary numerical context, inputs after the decimal point represent dollars).

As another example, if the context identifier(s) 418 indicate that a data entry field is associated with a date format (e.g., MM-DD-YYYY), the content analyzer circuitry 406 can translate numeric inputs such as "4" into words corresponding to a month such as April based on the execution of the content recognition rule(s) 420 and output the month as the value in the data entry field.

In examples in which the data entry field includes a symbol such as a decimal point or slash such that the symbol is not entered by a user as part of the data entry, the content analyzer circuitry 406 can account for a position of the symbol when analyzing the inputs in the data entry field. For instance, the content analyzer circuitry 406 can identify a position of a decimal point in the context of dollars or a slash in the context of a date of birth when determining the cumulative or total value. As an example, in the context of cents, the content analyzer circuitry 406 can recognize that when three digits have been provided, the cumulative value represents dollars rather than cents to account for a decimal point in the data entry field.

In some examples, the content analyzer circuitry 406 predicts the content in the data entry field based on at least a portion of the inputs received in the data entry field and the content recognition rule(s) 420. For instance, in the context of a dollar amount, the content analyzer circuitry 406 can predict that data inputs of "one", "two", "decimal" and "four" correspond to "twelve dollars and forty cents" without a user input of the digit "zero" after the "four."

Thus, as a result of the execution of the content recognition rule(s) 420, the content analyzer circuitry 406 identifies, predicts, or determines content in the data entry field based on the inputs in the data entry field and the context associated with the data entry field. The content analyzer circuitry 406 executes the content recognition rule(s) 420 in response to changes in inputs at the data entry field, such as the entry of additional inputs, deletion of previously entered inputs, etc. For example, the application interface circuitry 402 and/or the data evaluator circuitry 404 can identify changes in the inputs in the data entry field. If, for instance, a user deletes a numerical input from the data entry field and enters a new numerical input in the field, the content analyzer circuitry 406 determines the value (e.g., a new dollar value) of the inputs in the data entry field in view of the new input.

The content output circuitry 408 causes the content (e.g., value(s)) that have been predicted, identified, or determined by the content analyzer circuitry 406 to be output as audio output(s) by the user device 302 (e.g., the speaker(s) 312 of the user device 302, or via the private audio output device 314 in communication with the user device 302). In some examples, the database 414 stores audio samples 422 of letters, numbers, symbols and/or combinations thereof (e.g., words such as a month, words corresponding to a context identifier such as "dollars" or "cents"). The character audio samples 422 can be generated based on, for example, recorded speech and/or text-to-speech analysis. The content output circuitry 408 identifies the audio sample(s) 422 that represent the content identified by the content analyzer circuitry 406. The content output circuitry 408 generates instructions for the audio control circuitry 332 to output audio signal(s) corresponding to the selected audio sample(s) 422. The audio control circuitry 332 causes the audio signal(s) to be transmitted for output by the user device 302.

In some examples, the audio output(s) are generated based on, for instance, machine learning algorithm(s). In such examples, the audio output(s) can be generated in substantially real-time (e.g., milliseconds) in response to the predictions of the content (e.g., value(s)) by the content analyzer circuitry 406.

The content output circuitry 408 controls a rate at which the content (e.g., value(s)) identified by the content analyzer circuitry 406 is output as audio output(s) based on content output control rule(s) 424. In some examples, the content output circuitry 408 filters the audio outputs based on an amount of time between the inputs received at the data entry field (e.g., as identified by the application interface circuitry 402). For example, the instructions from the application 318 can indicate that the user is actively entering inputs into the data entry field. The content output control rule(s) 424 can define a minimum threshold time between inputs at the data entry field to enable the audio output(s) to be presented without being distorted, cut off, or nonsensical due to user entry of input(s) overlapping with output of the audio. In such examples, if the content output circuitry 408 determines that the threshold time is not satisfied (e.g., as measured from the last input provided in the data entry field), the content output circuitry 408 refrains from instructing the audio control circuitry 332 to output the audio output(s) until the threshold time is satisfied.

In some examples, the content output circuitry 408 can instruct the audio control circuitry 332 to stop outputting audio outputs (which can include stopping the audio output mid-speech) in response detection of an input in the data entry field during the presentation of the audio output. In some examples, the content output control rule(s) 424 indicate that the audio output(s) should be provided whether or not the user is actively entering inputs. In some other examples, the content output control rule(s) 424 indicate that the audio output(s) should be provided in response to a user input or command (e.g., a touch input on the display screen 304 of the user device 302, a voice command detected by the user device 302) requesting the audio output of the data in the data entry field.

In some examples, the example system 300 of FIGS. 3 and/or 4 includes means for interfacing with an application. For example, the means for interfacing may be implemented by the application interface circuitry 402. In some examples, the application interface circuitry 402 may be implemented by machine executable instructions such as that implemented by at least blocks 602, 614 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the application interface circuitry 402 is implemented by other hardware logic circuitry, hardware implemented state machines, and/or any other combination of hardware, software, and/or firmware. For example, the application interface circuitry 402 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example system 300 of FIGS. 3 and/or 4 includes means for evaluating data inputs. For example, the means for evaluating may be implemented by the data evaluator circuitry 404. In some examples, the data evaluator circuitry 404 may be implemented by machine executable instructions such as that implemented by at least blocks 604, 606, 608 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the data evaluator circuitry 404 is implemented by other hardware logic circuitry, hardware implemented state machines, and/or any other combination of hardware, software, and/or firmware. For example, the data evaluator circuitry 404 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example system 300 of FIGS. 3 and/or 4 includes means for analyzing content. For example, the means for analyzing may be implemented by the content analyzer circuitry 406. In some examples, the content analyzer circuitry 406 may be implemented by machine executable instructions such as that implemented by at least block 610 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the content analyzer circuitry 406 is implemented by other hardware logic circuitry, hardware implemented state machines, and/or any other combination of hardware, software, and/or firmware. For example, the content analyzer circuitry 406 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example system 300 of FIGS. 3 and/or 4 includes means for outputting content. For example, the means for outputting may be implemented by the content output circuitry 408. In some examples, the content output circuitry 408 may be implemented by machine executable instructions such as that implemented by at least block 612 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the content output circuitry 408 is implemented by other hardware logic circuitry, hardware implemented state machines, and/or any other combination of hardware, software, and/or firmware. For example, the content output circuitry 408 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the content recognizer control circuitry 324 of FIG. 3 is illustrated in FIG. 4, one or more of the elements, processes, and/or devices illustrated in FIG. 4 may be combined, divided, re-arranged, omitted, eliminated, and/or implemented in any other way. Further, the example application interface circuitry 402, the example data evaluator circuitry 404, the example content analyzer circuitry 406, the example content output circuitry 408, the example database 414 and/or, more generally, the example content recognizer circuitry 324 of FIG. 4 may be implemented hardware alone or by hardware in combination with software and/or firmware. Thus, for example, any of the example application interface circuitry 402, the example data evaluator circuitry 404, the example content analyzer circuitry 406, the example content output circuitry 408, the example database 414 and/or, more generally, the example content recognizer circuitry 324 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example content recognizer circuitry 324 of FIG. 3 may include one or more elements, processes, and/or devices in addition to, or instead of, those illustrated in FIG. 4, and/or may include more than one of any or all of the illustrated elements, processes, and devices.

Figure 5A:
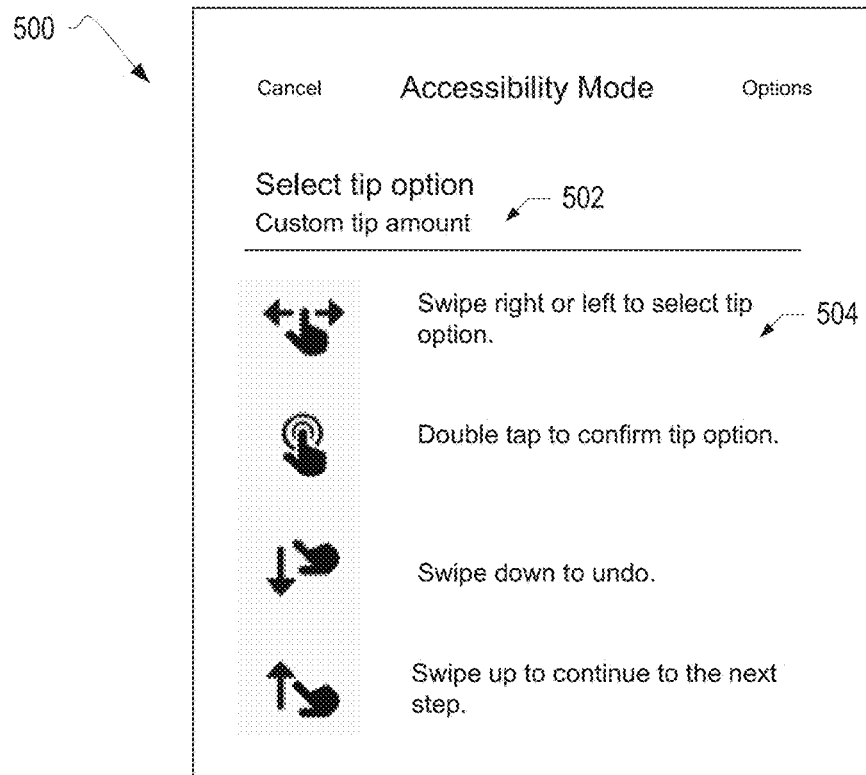
FIGS. 5A and 5B illustrate an example graphical user interface for data entry in accordance with teachings of this disclosure.
Figure 5B:
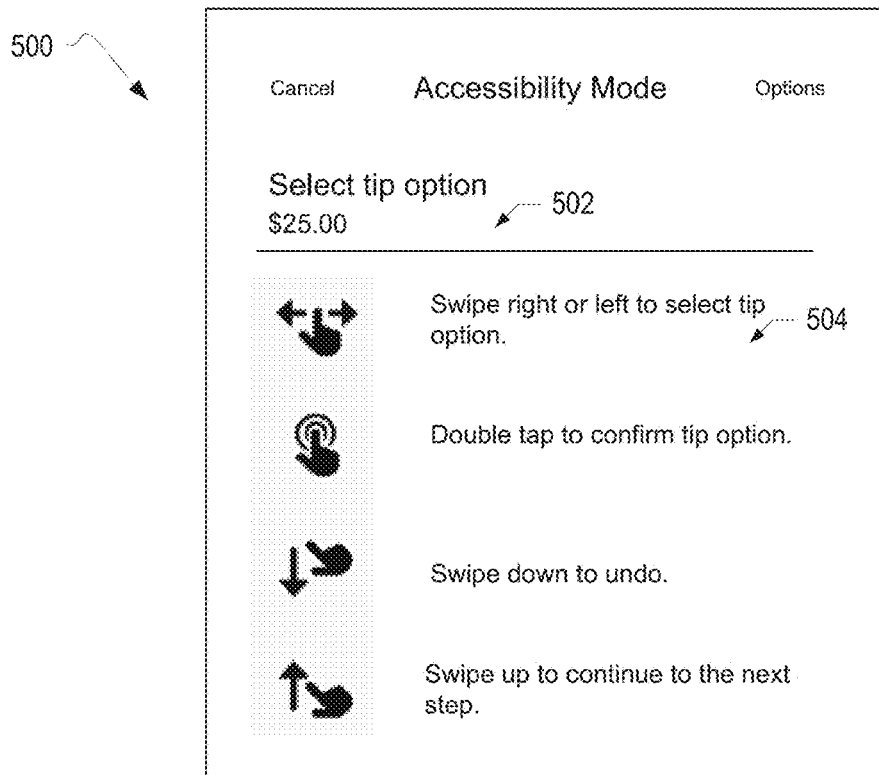

FIGS. 5A and 5B illustrate an example graphical user interface 500 of an application (e.g., the application 318 of FIG. 3) to enable customized data entry via the application. The interface 500 can be displayed via, for instance, the display screen 304 of the user device 302. In the example of FIGS. 5A and 5B, the application is operating in an accessibility mode, which can be accessed via user input selection(s) in the application (e.g., a menu selection). In the example of FIG. 5, the accessibility mode enables content recognition and output by the content recognizer circuitry 324 of FIGS. 3 and/or 4. However, in other examples the content recognizer circuitry 324 can perform content recognition analysis whether or not the application is in the accessibility mode.

The example interface 500 of FIGS. 5A and 5B includes a data entry field 502. As illustrated in FIG. 5A, the data entry field 502 permits a user to enter a customized service tip amount. The data entry field 502 can include other types of fields, including fields to accept numbers, letters, and/or symbols, and/or field associated with other contexts (e.g., a date, payment of a bill, deposit or withdrawal of money from an account).

In the example of FIGS. 5A and 5B, the context identifier(s) 418 defined by the data field entry rule(s) 416 indicate that the data entry field 502 accepts dollars but not cents. As shown in FIG. 5B, the user has entered the inputs "two," and "five" in the data entry field 502. In some examples, the inputs are provided via touch input(s) based on touch input command(s) 504 as illustrated in FIGS. 5A and 5B.

In the example of FIGS. 5A and 5B, when the user enters the digit "two" and there are no other inputs in the data entry field 502, the content analyzer circuitry 406 of FIG. 4 determines that the value in the data entry field 502 is "two dollars" based on context identifier(s) 418 for the data entry field 502 indicating that the field is associated with dollars but not cents and execution of the content recognition rule(s) 420. The content output circuitry 408 causes an audio output of the value "two dollars" to be presented (e.g., via the user device 302 that displays the interface 500). When the user enters the digit of "five" in succession relative to the input of "two," the content analyzer circuitry 406 determines that a value of "twenty-five dollars" is in the data entry field 502 and the content output circuitry 408 causes an audio output of the value "twenty-five dollars" to be presented.

In other examples, the data entry field 502 can permit a user to enter cents in addition to dollars. In such examples, the user can enter a decimal point symbol and the digit "three" after the entry of the digits "two" and "five." The content analyzer circuitry 406 determines that the value in the data entry field 502 is "twenty-five dollars and thirty cents" based on the context identifier(s) 418 indicating that the data entry field is associated with dollars and cents and the content recognition rule(s) 420. The content output circuitry 408 causes an audio output of the value "twenty-five dollars and thirty cents" to be presented.

In other examples, the decimal point may be provided by the data entry field 502 such that the user does not enter the decimal point into the data entry field 502 as part of the data entry. In such examples, the content analyzer circuitry 406 determines the dollar values based on a location of the digits relative to the decimal point. For instance, when the user has entered the digit "two" and no other values in the data entry field 502, the content analyzer circuitry 406 determines that a value of "two cents" is in the data entry field 502 based on the position of the digit "two" relative to the decimal point. When the user subsequently enters the digits "five," "three," and "zero," the content analyzer circuitry 406 determines that a value of "twenty-five dollars and thirty cents" is in the data entry field 502 based on the position of the digits relative to the decimal point.

As disclosed herein, the audio output(s) corresponding to the content in the data entry field 502 can be provided as the user enters the input(s) in the data entry field 502 (e.g., after each digit is entered), in response to a user command, and/or based on other rules for causing the audio output(s) to be presented (e.g., a minimum time threshold between entry of input(s) in the data entry field 502).

In some examples, the data entry field 502 may have a limit on the number of digits that can be entered in the field 502 (e.g., five digits total, such as a maximum value of $999.99), a limit on the number of symbols entered, etc. In such examples, if the user enters more than the allowable number of digits and/or enters two decimal points in the data entry field 502, the data evaluator circuitry 404 can cause an error message to be output. The error message can be displayed via, for example, the interface 500. In such examples, the content analyzer circuitry 406 may refrain from analyzing the inputs in the data entry field 502 and/or the content output circuitry 408 refrains from causing the audio output(s) from being presented until the error(s) are addressed.

Figure 6:
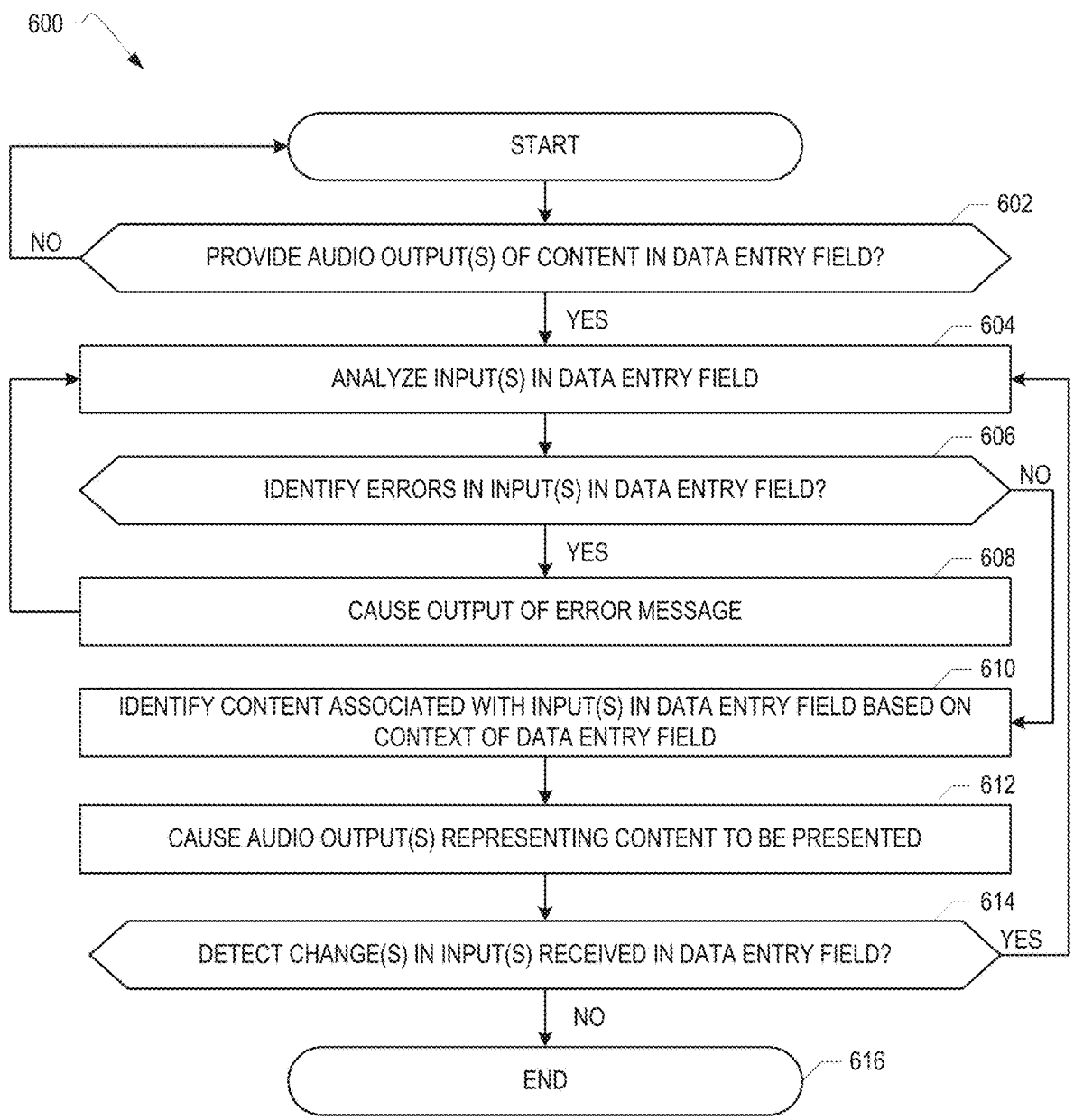
FIG. 6 is a flowchart representative of example machine readable instructions that may be executed by example processor circuitry to implement the example content recognizer circuitry of FIGS. 3 and/or 4.

A flowchart representative of example hardware logic circuitry, machine readable instructions, hardware implemented state machines, and/or any combination thereof for implementing the content recognizer circuitry 324 of FIGS. 3 and/or 4 is shown in FIG. 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example content recognizer circuitry 324 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to provide audio outputs of content (e.g., a total value of numerical inputs) in a data entry field (e.g., a field permitting entry of customized dollar amounts, dates, etc. such as the data entry field 502 of FIG. 5) of a user application (e.g., the application 318 of FIG. 3) installed on a user device (e.g., the user device 302 of FIG. 3, such as a customer device or a point of sale device). The machine readable instructions and/or operations 600 of FIG. 6 begin at block 602 at which the application interface circuitry 402 of FIG. 4 determines whether audio output(s) of the content in the data entry field should be provided in response to, for instance, user selection of a mode (e.g., an accessibility mode) of the application 318 indicating that audio output(s) of the content should be provided.

At block 604, the data evaluator circuitry 404 analyzes the input(s) (e.g., numeric digits) entered by a user in the data entry field based on the data input recognition rule(s) 412 (e.g., text recognition). At block 606, the data evaluator circuitry 404 determines if error(s) are present in the input(s) based on the data entry field rule(s) 416. For instance, the data evaluator circuitry 404 can determine there is an error in response to detection of two decimal points in a data entry field. If the data evaluator circuitry 404 identifies error(s) based on the input(s) in the data entry field, then at block 608, the data evaluator circuitry 404 causes an error message to be output (e.g., displayed via an interface of the application 318, such as the interface 500 of FIG. 5). If the data evaluator circuitry 404 detects error(s) in the data entry field input(s), control returns to block 604, where the data evaluator circuitry 404 continues to analyze input(s) received in the data entry field.

If the data evaluator circuitry 404 does not identify any errors in the data input(s) based on the data entry field rule(s) 416, the content analyzer circuitry 406 identifies, predicts, or determines content associated with the input(s) in the data entry field based on a context of the data entry field at block 610. For example, the content analyzer circuitry 406 identifies the context identifier(s) 418 (e.g., dollars; dollars and cents) associated with the data entry field. The content analyzer circuitry 406 executes the content recognition rule(s) 420 to predict the content associated with the input(s) in the data entry field at a given time. For instance, the content analyzer circuitry 406 can determine a (e.g., total, entire) value of numerical input(s) in the data entry field representing a dollar amount, based on the context identifier(s) 418 and the content recognition rule(s) 420.

At block 612, the content output circuitry 408 causes audio output(s) representing the content (e.g., a dollar amount) identified by the content analyzer circuitry 406 to be presented via, for instance, the speaker(s) 312 of the user device 302 and/or a private audio output device 314 communicatively coupled to the user device 302. The content output circuitry 408 controls the presentation of the audio output(s) based on the content output control rule(s) 424 (e.g., a rate at which the audio output(s) are presented based on, for example, time thresholds between entry of the inputs in the data entry field).

At block 614, the application interface circuitry 402 and/or the data evaluator circuitry 404 may identify changes to the input(s) in the data entry field (e.g., based on instructions from the application 318, based on analysis of the inputs). For example, a user may enter another input or delete an input from the data entry field. The content analyzer circuitry 406 executes the content recognition rule(s) 420 to determine the content associated with the input(s) in the data entry field at a given time in view of the changes to the data inputs. The content output circuitry 408 causes audio feedback of the content in the data entry field at a given time to be presented to provide an indication of current or cumulative content in the data entry field at the particular time. In some examples, an input can include a plurality of inputs entered in succession. In some such examples, the inputs are entered in, for instance, rapid succession or, put another way, a minimum time threshold between the entry of each input (e.g., a character input) for providing corresponding audio output(s) is not satisfied. In such examples, the content output circuitry 408 may refrain from instructing the audio control circuitry 332 to output audio until the threshold time between inputs is met to avoid nonsensical outputs.

When no further changes at the data entry field are detected, the instructions 600 of FIG. 6 end at block 616.

Figure 7:
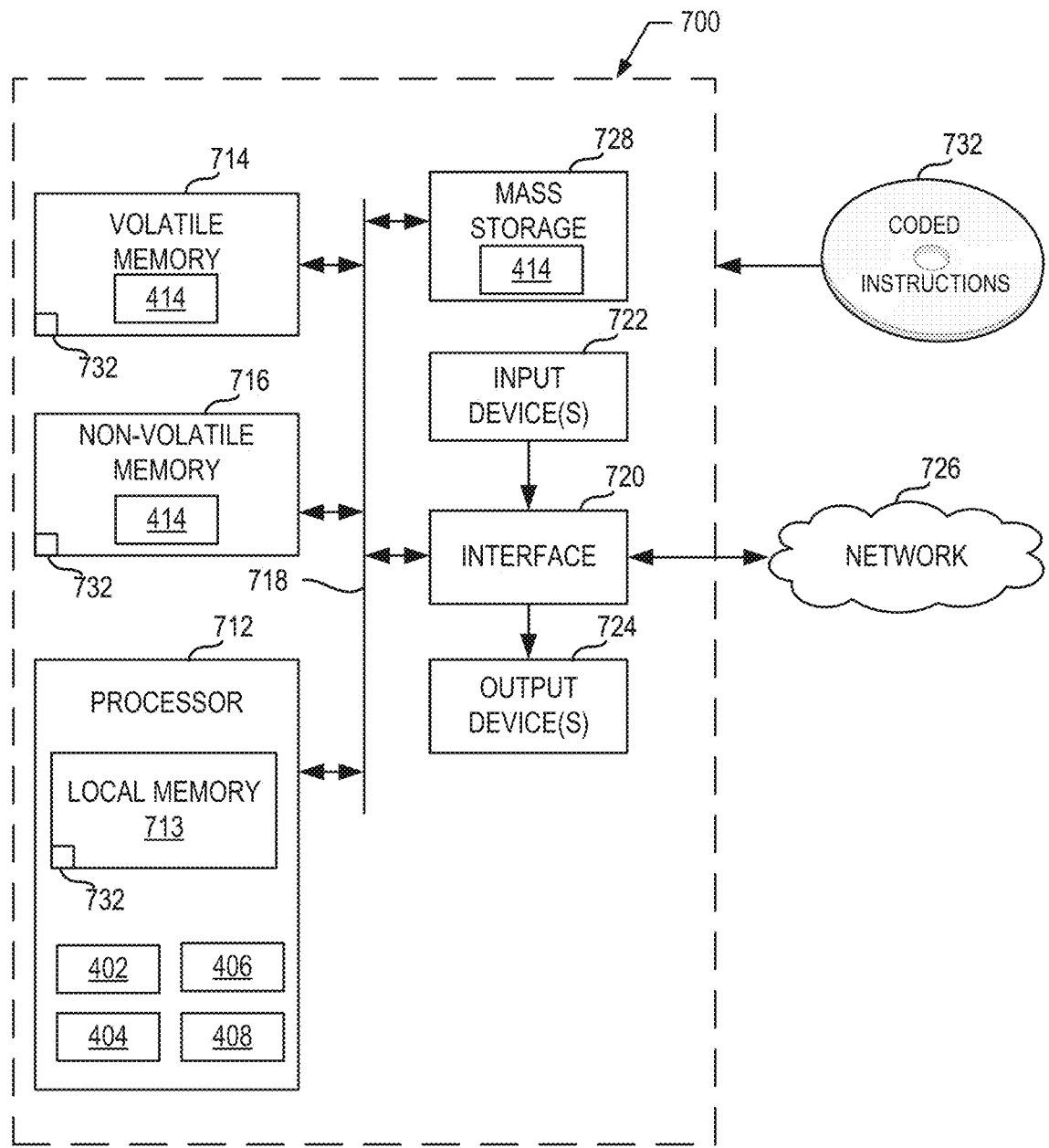
FIG. 7 is a block diagram of an example processing platform including processor circuitry structured to execute the example machine readable instructions of FIG. 6 to implement the example content recognizer circuitry of FIGS. 3 and/or 4.

FIG. 7 is a block diagram of an example processor platform 700 structured to execute and/or instantiate the machine readable instructions and/or operations of FIG. 6 to implement the content recognizer circuitry 324 of FIGS. 3 and/or 4. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example application interface circuitry 402, the example data evaluator circuitry 404, the example content analyzer circuitry 406, and the example content output circuitry 408.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIG. 6, may be stored in the mass storage device 728, in the volatile memory 714, in the non-volatile memory 716, and/or on a removable non-transitory computer readable storage medium such as a CD or DVD.

Figure 8:
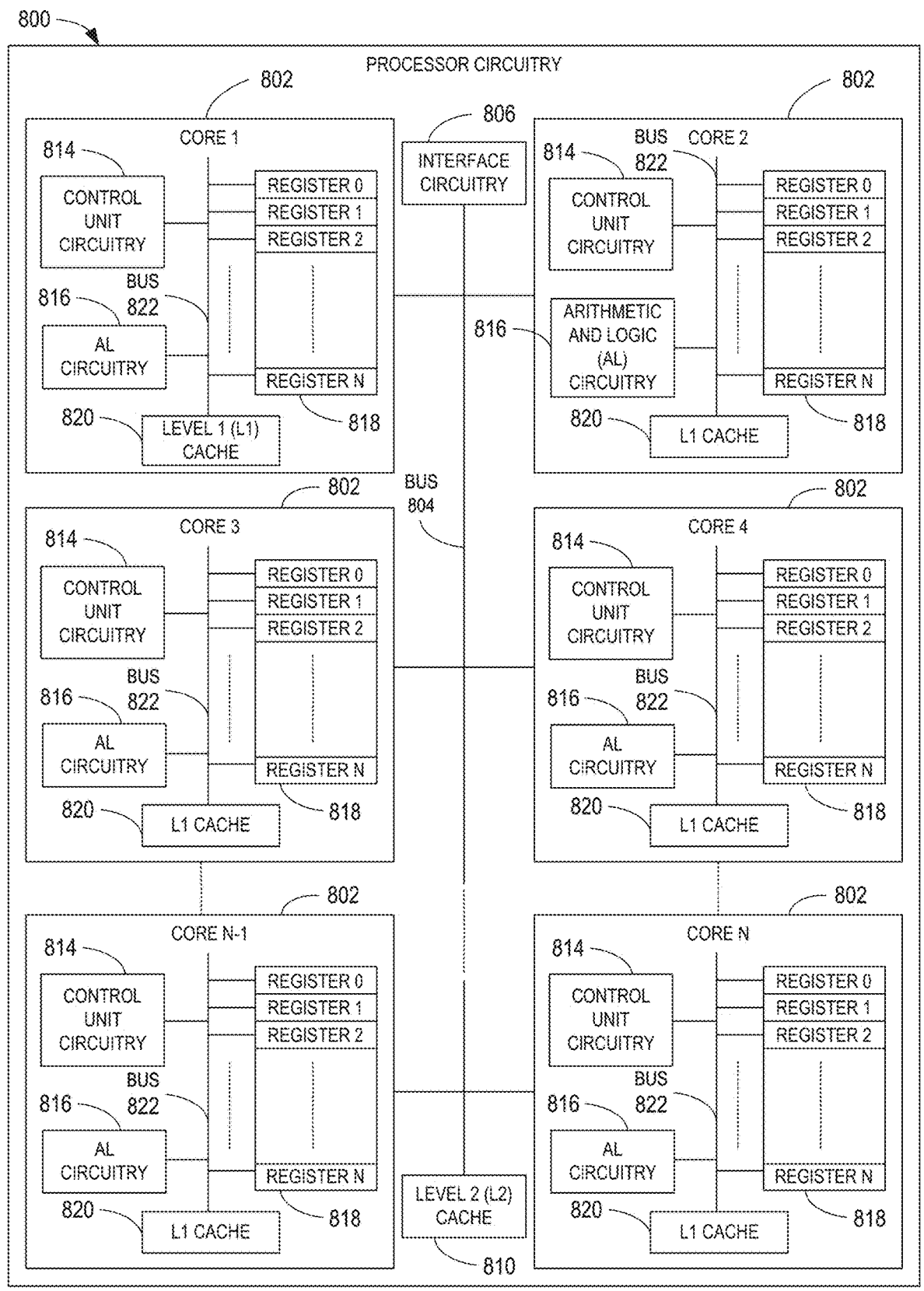
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 6.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 820 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
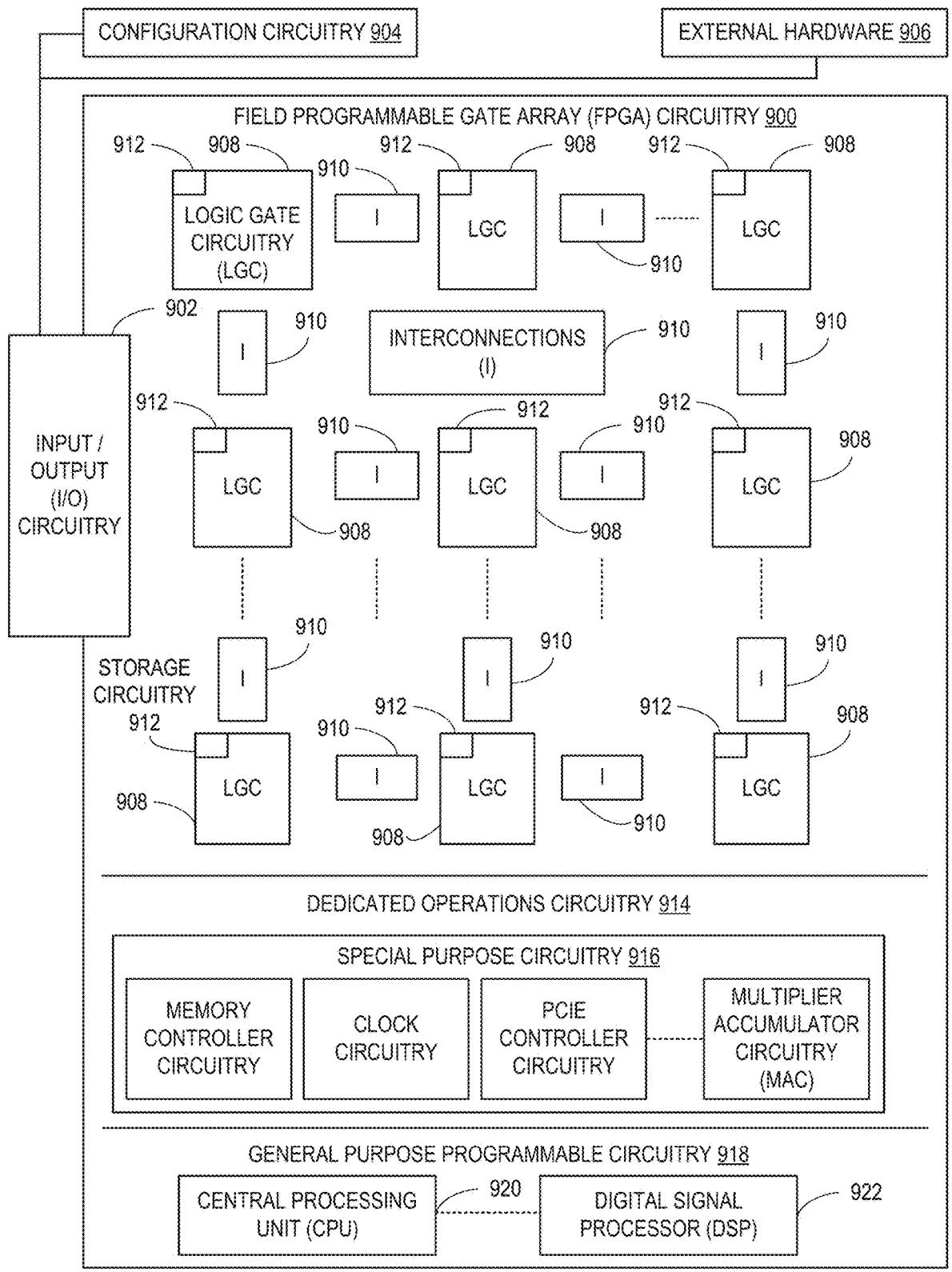
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIG. 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIG. 6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIG. 6. As such, the FPGA circuitry 900 may be structured to effectively instantiate some or all of the machine readable instructions of the flowchart of FIG. 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIG. 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry _00 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIG. 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIG. 6 may be executed by one or more of the cores 802 of FIG. 8 and a second portion of the machine readable instructions represented by the flowchart of FIG. 6 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
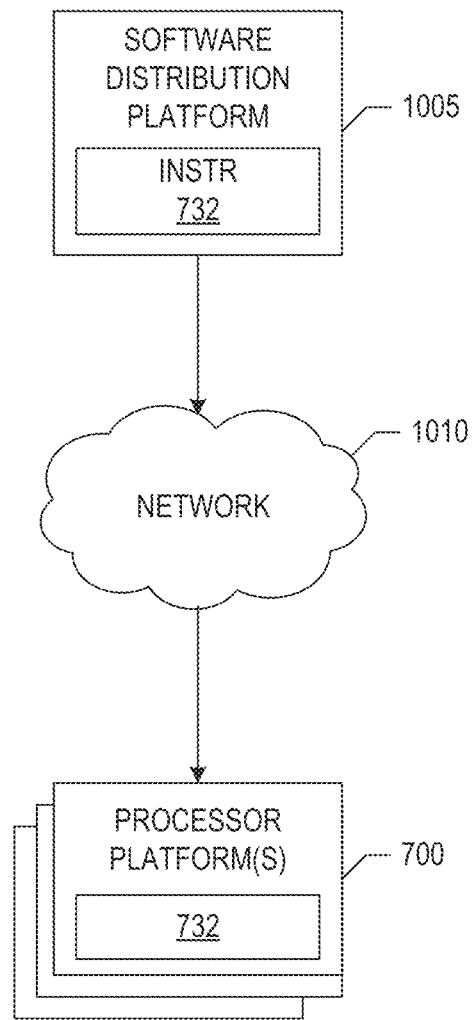
FIG. 10 is a block diagram of an example software distribution platform (e.g., one or more servers) to distribute software (e.g., software corresponding to the example machine readable instructions of FIG. 6 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 600 of FIG. 6, as described above. The one or more servers of the example software distribution platform 1005 are in communication with a network 1010, which may correspond to any one or more of the Internet and/or any of the example networks 726 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 732 of FIG. 7, may be downloaded to the example processor platform 700, which is to execute the machine readable instructions 732 to implement the content recognizer circuitry 324. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that provide for translation of inputs such as numerical inputs in a data entry field of an application to content indicative of a context of the data entry field, such as a cumulative value of a dollar amount entered in the data entry field. Examples disclosed herein cause audio output(s) representing the content to be presented to inform a user of the content. Examples disclosed herein identify, determine, or predict the content based on context identifiers associated with the data entry field (e.g., a monetary field, a date field, etc.). Examples disclosed herein dynamically respond to changes in the input(s) of the data entry field to provide audio outputs that inform a user of the content entered in the data entry field within a context of the field.

Example methods, apparatus, systems, and articles of manufacture for providing data entry feedback at electronic user devices are disclosed herein. Further examples and combinations thereof include the following:

Example 1 includes an apparatus comprising instructions stored in a memory and processor circuitry to execute the instructions to identify a first value based on a first input in a data entry field via an interface of an electronic device, the first value representing contents of the data entry field at a first time; cause the electronic device to output a first audio output of the first value; identify a second value based on the first input and a second input, the second input received in the data entry field after the first input, the second value representing the contents of the data entry field at a second time, the second time after the first time; and cause the electronic device to output a second audio output of the second value.

Example 2 includes the apparatus of example 1, wherein the processor circuitry is to determine a context identifier for the data entry field, the identifying of the first value based on the context identifier.

Example 3 includes the apparatus of examples 1 or 2, wherein the context identifier includes a monetary identifier.

Example 4 includes the apparatus of any of examples 1-3, wherein the processor circuitry is to cause the electronic device to output the first audio output in response to the entry of the first input in the data entry field and to output the second audio output in response to the entry of the second input in the data entry field.

Example 5 includes the apparatus of any of examples 1-4, wherein the processor circuitry is to identify a third value based on the first input, the second input, and a third input, the third input received in the data entry field after the first input and the second input; and cause the electronic device to output a third audio output of the third value.

Example 6 includes the apparatus of any of examples 1-5, wherein the processor circuitry is to detect an error in a third input received in the data entry field based on the first input and the second input; and cause the electronic device to output an error message in response to the detection of the error.

Example 7 includes the apparatus of any of examples 1-6, wherein the processor circuitry is to detect a third input and a fourth input in the data entry field, the third input in succession relative to the second input, the fourth input in succession relative to the third input; when an amount of time between the second input and the third input exceeds a threshold, cause the electronic device to output a third audio output of a third value based on the first input, the second input, and the third input; and when the amount of time between the second input and the third input does not exceed the threshold, cause the electronic device to refrain from outputting the third audio output of the third value and to output a fourth audio output of a fourth value based on the first input, the second input, the third input, and the fourth input.

Example 8 includes the apparatus of any of examples 1-7, wherein the first input includes a plurality of characters.

Example 9 includes a non-transitory computer readable storage medium comprising instructions that, when executed, cause at least one processor to at least determine content in a data entry field of an interface of an electronic device based on one or more inputs in the data entry field and a context identifier associated with the data entry field; and cause the electronic device to output audio representing the content.

Example 10 includes the non-transitory computer readable storage medium of example 9, wherein the one or more inputs include a first input, the content includes first content, the audio is first audio, and the instructions, when executed, cause the at least one processor to detect a second input in the data entry field, the second input received in the data entry field after the first input; determine second content based on the first input and the second input; and cause the electronic device to output second audio representing the content.

Example 11 includes the non-transitory computer readable storage medium of examples 9 or 10, wherein the instructions, when executed, cause the at least one processor to cause the electronic device to output the first audio in response to detection of the first input in the data entry field and to output the second audio in response to the detection of the second input in the data entry field.

Example 12 includes the non-transitory computer readable storage medium of any of examples 9-11, wherein the instructions, when executed, cause the at least one processor to cause the electronic device to output the second audio in response to a time threshold between the detection of the second input in the data entry field and detection of a third input in the data entry field.

Example 13 includes the non-transitory computer readable storage medium of any of examples 9-12, wherein the one or more inputs includes a first input, a second input, and a third input and the instructions, when executed, cause the at least one processor to detect an error with respect to the second input; and determine the content based on the first input and the third input.

Example 14 includes the non-transitory computer readable storage medium of any of examples 9-13, wherein the content includes first content, the audio is first audio, and the instructions, when executed, cause the at least one processor to detect a change with respect to the one or more inputs; determine second content in response to the change in the one or more inputs; and cause the electronic device to output second audio representing the second content.

Example 15 includes a method comprising identifying a first value based on a first input in a data entry field via an interface of an electronic device, the first value representing contents of the data entry field at a first time; causing the electronic device to output a first audio output of the first value; identifying a second value based on the first input and a second input, the second input received in the data entry field after the first input, the second value representing the contents of the data entry field at a second time, the second time after the first time; and causing the electronic device to output a second audio output of the second value.

Example 16 includes the method of example 15, further including associating the data entry field with a context identifier, the identifying of the first value based on the context identifier.

Example 17 includes the method of examples 15 or 16, further including causing the electronic device to output the first audio output after the entry of the first input in the data entry field and to output the second audio output after the entry of the second input in the data entry field.

Example 18 includes the method of any of examples 15-17, further including identifying a third value based on the first input, the second input, and a third input, the third input received in the data entry field after the first input and the second input; and causing the electronic device to output a third audio output of the third value.

Example 19 includes the method of any of examples 15-18, further including detecting an error in a third input received in the data entry field based on the first input and the second input; and causing the electronic device to output an error message in response to the detection of the error.

Example 20 includes the method of any of examples 15-19, further including detecting the first value and the second value as being in succession in the data entry field.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   machine-readable instructions; and
   at least one processor circuit to be programmed by the machine-readable instructions to at least:
   identify a first value based on a first input in a data entry field via an interface of an electronic device, the first value representing contents of the data entry field at a first time;
   cause the electronic device to output a first audio output of the first value;
   identify a second value based on the first input and a second input in the data entry field, the second input received in the data entry field after the first input, the second value representing the contents of the data entry field at a second time, the second value cumulative relative to the first value, the second time after the first time; and
   cause the electronic device to output a second audio output of the second value.

2. The apparatus of claim 1, wherein one or more of the at least one processor circuit is to determine a context identifier for the data entry field, the identifying of the first value based on the context identifier.

3. The apparatus of claim 2, wherein the context identifier includes a monetary identifier.

4. The apparatus of claim 1, wherein one or more of the at least one processor circuit is to cause the electronic device to identify the first value and output the first audio output in response to entry of the first input in the data entry field and to identify the second value and output the second audio output in response to entry of the second input in the data entry field.

5. The apparatus of claim 1, wherein one or more of the at least one processor circuit is to:
   identify a third value based on the first input, the second input, and a third input, the third input received in the data entry field after the first input and the second input; and
   cause the electronic device to output a third audio output of the third value.

6. The apparatus of claim 1, wherein one or more of the at least one processor circuit is to:
   detect an error in a third input received in the data entry field based on the first input and the second input; and
   cause the electronic device to output an error message in response to the detection of the error.

7. The apparatus of claim 1, wherein one or more of the at least one processor circuit is to:
   detect a third input and a fourth input in the data entry field, the third input in succession relative to the second input, the fourth input in succession relative to the third input;
   when an amount of time between the second input and the third input exceeds a threshold, cause the electronic device to output a third audio output of a third value based on the first input, the second input, and the third input; and
   when the amount of time between the second input and the third input does not exceed the threshold, cause the electronic device to refrain from outputting the third audio output of the third value and to output a fourth audio output of a fourth value based on the first input, the second input, the third input, and the fourth input.

8. The apparatus of claim 1, wherein the first input includes a plurality of characters.

9. A non-transitory computer readable storage medium comprising machine-readable instructions to cause at least one processor circuit to at least:
   determine a first value in a data entry field of an interface of an electronic device based on (a) an entirety of inputs in the data entry field at a first time and (b) a context identifier associated with the data entry field;
   cause the electronic device to output first audio representing the first value;
   detect a second input in the data entry field, the second input received in the data entry field after the first time;

determine a second value based on a second entirety of inputs at a second time and the context identifier, the second time after the first time, the second entirety of inputs including the second input and the entirety of the inputs in the data entry field at the first time; and
cause the electronic device to output second audio representing the second value.

10. The non-transitory computer readable storage medium of claim 9, wherein the entirety of inputs at the first time includes a first input and the machine-readable instructions are to cause one or more of the at least one processor circuit to cause the electronic device to determine the first value and output the first audio in response to detection of the first input in the data entry field and to determine the second value and output the second audio in response to the detection of the second input in the data entry field.

11. The non-transitory computer readable storage medium of claim 9, wherein the machine-readable instructions are to cause one or more of the at least one processor circuit to cause the electronic device to output the second audio in response to a time threshold between the detection of the second input in the data entry field and detection of a third input in the data entry field.

12. The non-transitory computer readable storage medium of claim 9, wherein the entirety of inputs at the first time includes a first input and the entirety of inputs at third time after the first time and the second time includes the first input, the second input, a third input, and a fourth input, and the machine-readable instructions are to cause one or more of the at least one processor circuit to:
   detect an error with respect to the third input; and
   determine a third value based on the first input, the second input, and the fourth input but not the third input.

13. The non-transitory computer readable storage medium of claim 9, wherein the machine-readable instructions are to cause one or more of the at least one processor circuit to:
   detect a change from the second input to a revised second input, a third entirety of inputs at a third time including the revised second input, the third time after the first time and the second time;
   determine a third value based on the third entirety of inputs; and
   cause the electronic device to output third audio representing the third value.

14. A method comprising:
   identifying a first value based on a first input in a data entry field via an interface of an electronic device, the first value representing a total value of contents of the data entry field at a first time;
   causing the electronic device to output a first audio output of the first value;
   identifying a second value based on the first input and a second input, the second input received in the data entry field after the first input, the second value representing a total value of the contents of the data entry field at a second time, the second time after the first time; and
   causing the electronic device to output a second audio output of the second value.

15. The method of claim 14, further including associating the data entry field with a context identifier, the identifying of the first value based on the context identifier.

16. The method of claim 14, further including causing the electronic device to output the first audio output after entry of the first input in the data entry field and without a user input requesting the first audio output and to output the second audio output after entry of the second input in the data entry field and without a user input requesting the second audio output.

17. The method of claim 14, further including:
   identifying a third value based on the first input, the second input, and a third input, the third input received in the data entry field after the first input and the second input; and
   causing the electronic device to output a third audio output of the third value.

18. The method of claim 14, further including:
   detecting an error in a third input received in the data entry field based on the first input and the second input; and
   causing the electronic device to output an error message in response to the detection of the error.

19. The method of claim 14, further including detecting the first input and the second input as being in succession in the data entry field.

* * * * *